May 29, 1956   H. BÜTTNER   2,747,619
METHOD OF PRODUCTION OF CONNECTING
WIRES FOR A SET OF COIL SPRINGS
Original Filed Feb. 12, 1953   3 Sheets-Sheet 2
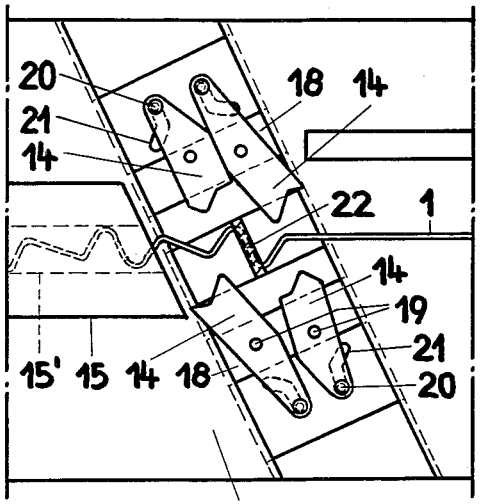
Fig. 3
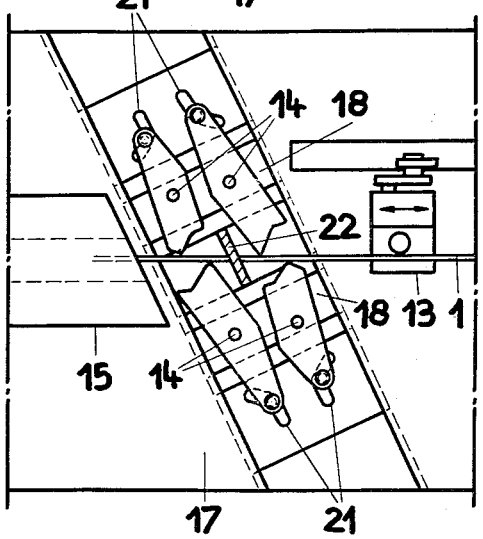
Fig. 4
Fig. 9    Fig. 10    Fig. 11
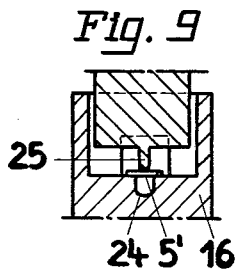 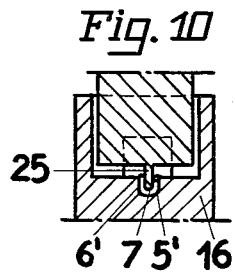 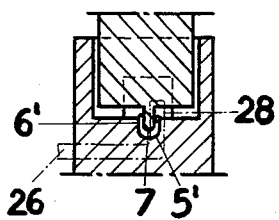
INVENTOR.
Hugo Büttner
BY
ATTORNEY

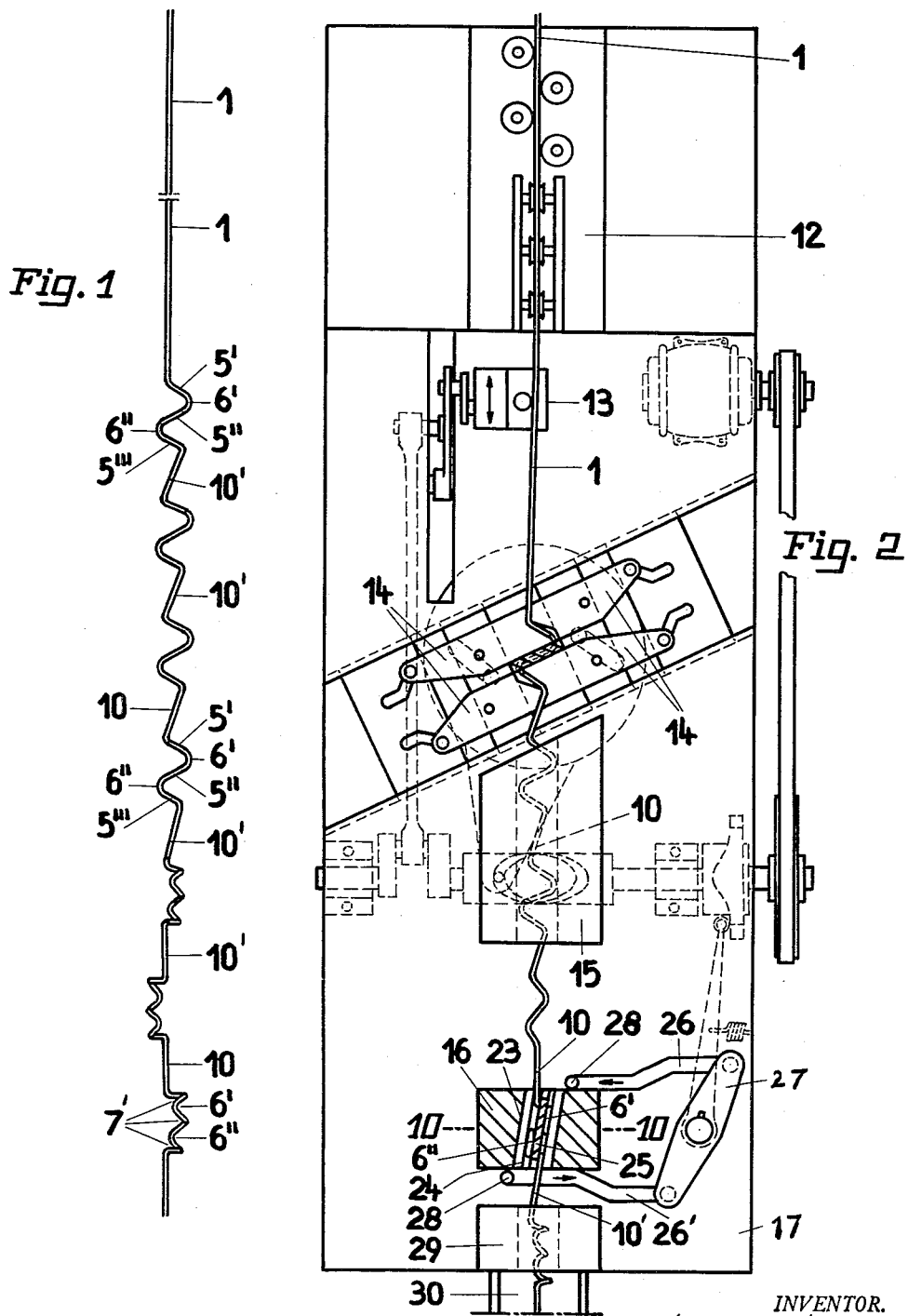

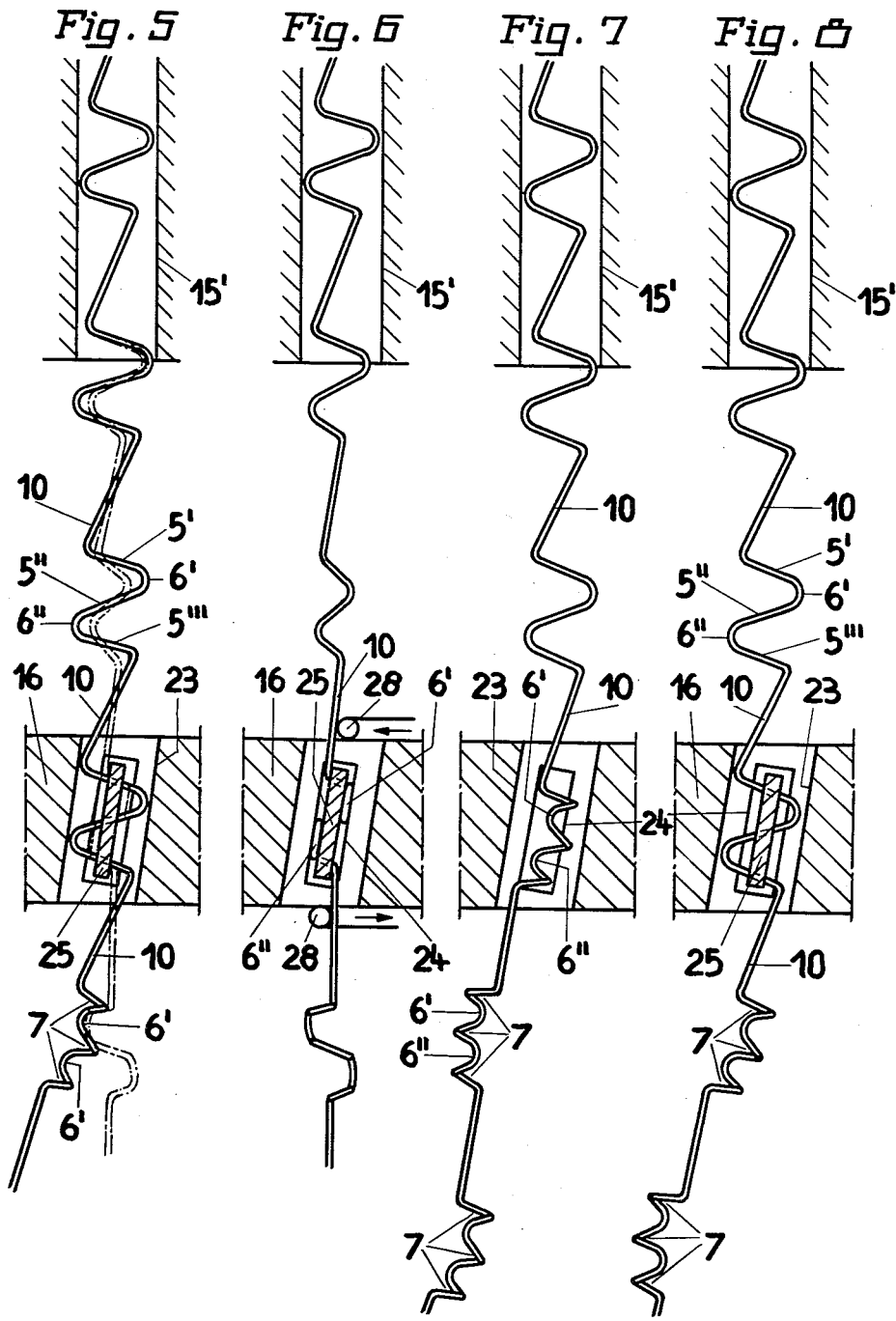

United States Patent Office 2,747,619
Patented May 29, 1956

2,747,619
METHOD OF PRODUCTION OF CONNECTING WIRES FOR A SET OF COIL SPRINGS

Hugo Büttner, Wuppertal-Vohwinkel, Germany

Original application February 12, 1953, Serial No. 336,612, now Patent No. 2,733,454, dated February 7, 1956. Divided and this application March 31, 1954, Serial No. 420,136

Claims priority, application Germany March 1, 1952

2 Claims. (Cl. 140—71)

The present invention relates to a method of the production of connecting wires for a set of coil springs and in particular to such connecting wires which are equipped with pre-shaped clamps for spring assemblies for mattresses or the like, which connecting wires may be used for the mechanical production of frameless spring assemblies which consist of rows of cylindrical coil springs, each spring in each row being disposed between a pair of adjacent springs of the adjacent row.

This application is a division of patent application Serial No. 336,612, filed on February 12, 1953 now Patent No. 2,733,454, granted February 7, 1956.

In the copending patent application, Serial No. 336,612 means for securing the windings of springs in mattresses or the like have been disclosed which means comprise longitudinally disposed connecting wires which connect each spring individually by means of this connecting wire.

This connecting wire comprises laterally open and alternately in opposite directions disposed hook formations which consist of three legs and two heads, which hook formations are formed from sinus-shaped bendings of the wire and in particular S- or Z-shaped bendings which are formed to hook formations by bending over the heads of such bendings.

It is one object of the present invention to provide a method for manufacturing such connecting wire, in order to preform this connecting wire in an automatic process which constitutes a part of the manufacturing process for the spring inserts.

In the automatic manufacturing process of this connecting wire unexpected difficulties have been encountered because the laterally open clamps had to be disposed alternately in opposite directions.

It is, therefore, another object of the present invention to provide a method of forming a connecting wire for the individual springs of a spring insert by bending a length of wire to sinus-shaped and in particular to S- or Z-shaped bendings to form each of said bendings to a hook formation along a bending line which is disposed obliquely to the longitudinal axis of the length of wire, and finally to draw the bridge portions formed by said length of wire between each pair of adjacent bendings into the line of the longitudinal axis of said length of wire.

The method in accordance with the present invention leads to a connecting wire which is arranged symmetrically to its longitudinal axis in substantially two subsequent steps, which connecting wire may be placed easily adjacent the series of individual springs and be easily connected therewith since in its final state the connecting wire with its hook formations extends along the longitudinal axis of said length of wire, the hook formations of which are bent alternately to the individual springs of two adjacent series of such springs.

It is another object of the present invention to provide a method for manufacturing a connecting wire having hook formations extending alternately in opposite directions by using the same bending tools, which alternate formation is brought about by retaining said S- or Z-shaped bending crosswise to the bending line and thereby turning the length of wire, so that upon release of the formed hook formation the resiliency of the wire brings about a turning of the formed hook formation.

It is still another object of the present invention to enhance the resilient effect of the bridge portions of the length of wire disposed between each pair of adjacent hook formations by arranging the bending line during the hook forming process close to the head of the sinus-shaped bendings, so that the legs of the bendings operate as levers in the finished spring insert and function in the manner of a torsion rod.

With these and other objects in view which will become apparent in the detailed description, the present invention will be clearly understood in connection with the accompanying drawings, in which:

Figure 1 is a plan view of a section of the connecting wire showing the step-wise forming of the same;

Fig. 2 is a plan view of an apparatus designed for performing the method of the present invention;

Figs. 3 and 4 are fragmentary views of the apparatus shown in Fig. 2 indicating particular steps during the bending process;

Figs. 5 to 8 are fragmentary views of the device designed for the hook formation; and Figs. 9, 10 and 11 are sectional views along the lines 10—10 of Fig. 2 showing the die in different positions during the forming process.

The connecting wire in accordance with the present invention is formed in the following manner:

The spring wire 1, which may be taken from a reel (not shown) and which at first is straight as shown in Fig. 1, is formed at first to sinus-shaped, as for instance S- or Z-shaped projections which are equally spaced apart from each other. The leg 5' of each projection leads to a connecting leg 5" forming therebetween the head portion 6'. The connecting leg 5" leads to a second leg 5''' forming in between a second head portion 6" which is disposed opposite the first head portion 6' and the second leg 5''' leads to the connecting wire bridge 10'.

The clamps 7' are formed from the thus pre-shaped spring wire 1 by further shaping, for instance by bending the heads 6' and 6". A die which is disposed at an angle to the longitudinal axis of the spring wire is used to bring this about and the pre-shaped wire is fed in its bending plane. Simultaneously, the bridge portions 10' between the leg 5''' of one projection and the leg 5' of the proceeding projection are drawn in substantially linear direction.

An apparatus for performing the just described method comprises by example a directional rolling mill 12, a feeding device 13, a bending device 14, a guide 15, and a press 16 which are disposed in proper relation to each other on a common base 17.

The bending device 14 has bending tools which are mounted on carriages 18 movable relative to each other and pivotally mounted on pins 19. Guide bolts 20 which extend into control slides 21 bring about the turning of the bending tools.

On the oppositely disposed narrow edges of the bending tools, which are designed as double levers, a profile is provided which corresponds with the shape of the desired bending of the connecting wire. A holder 22 is provided above the connecting wire 1 in an opening through the bending device 14 to maintain the connecting wire in position during its feeding through the bending device.

The guide 15 is arranged immediately behind the bending device 14, which guide 15 has a flat channel 15' which surrounds the pre-shaped bendings of the connecting wire.

A press 16 designed to bring about the bending of the heads 6' and 6" is disposed properly spaced apart from the terminal of the channel 15'.

The press comprises a frame which is equipped with a slot 23 disposed at an angle to the direction of movement of the connecting wire 1. The bottom of the slot 23 has a matrix recess 24 designed for the bending of the heads 6' and 6". The die 25 fitted in the recess 24 is likewise disposed at an angle to the longitudinal axis of the wire, so that the bending plane of the head crosses the legs 5' and 5''' of the projection about at a right angle, and the plane through the clamp is inclined with respect to the longitudinal axis of the wire formed by the bridge portions 10'.

Drawing arms 26 and 26' are provided on both sides of the press frame, the drawing arms 26 and 26' being movable crosswise to the direction of movement of the die. Both drawing arms 26 and 26' are pivotally secured to a double lever 27. The ends of the drawing arms 26 and 26' have upwardly extending connecting members 28 which engage, during the movement of the drawing arms, in opposite directions, the bridge portions 10' of the connecting wire.

A catch socket 29 with a following groove 30 which receives the completely pre-shaped wire is disposed at the exit of the press.

The above-described device operates in the following manner:

The connecting wire 1 which is completely straightened out by the rolling mill 12 is fed intermittently, namely step by step, by means of the feeding device 13 into the bending device 14, the claws of which are shown open in Fig. 3. The oppositely disposed bending claws are now fed toward each other and their profiled inner ends grip the connecting wire 1 (see Fig. 4), so that upon further advance of the bending claws and simultaneous turning movement into the position shown in Fig. 2, the bending claws perform the required bending in the connecting wire 1. Then the bending claws are returned again into their original position shown in Fig. 3.

The subsequent movement of the connecting wire brings the bendings of the latter into the guide 15, whereupon the following bending process may be performed.

The pre-shaped connecting wire 1 moves, due to the operation of the weeding device 13, into the slot 23 of the press 16 in such manner that the pre-formed bend of the wire is disposed below the die 25 (see Fig. 5).

Upon lowering of the die 25, the bend of the connecting wire 1 is pressed into the matrix recess 24 (see Figs. 6 and 10), whereby the legs 5', 5" and 5''' are bent to U-shape, so that particular portions are formed from the heads 6' and 6". During the mentioned bending process, the legs assume a vertical position, whereby the bridge portion 10' of the connecting wire, which is disposed between the press 16 and the channel 15', is rotated as indicated in point dotted lines in Fig. 5.

The preceding clamp formed during the previous die stroke is likewise turned, as shown in Fig. 5, for an angle of 90°, so that the mouth of the clamp is disposed in vertical direction opposite to the mouth of the newly formed clamp.

The connecting members 28 move towards the bridge portions 10' while the die 25 grips the formed hook and the connecting members 28 straighten the bridge portions 10' so that the hooks are finally disposed symmetrically to the straight median axis of the connecting wire (see Fig. 11).

When the die 25 is removed from the hook, the spring wire relaxes and turns the formed clamp into the plane of the bendings (see Fig. 7). Now, the wire advances further, so that a new pre-shaped bent portion of the wire reaches the position under the die (see Fig. 8).

While I have disclosed one embodiment of the present invention, it is to be understood that this embodiment is given by example only and not in a limiting sense, the scope of the present invention being determined by the objects and the claims.

I claim:
1. The method of forming a connecting wire, having a plurality of laterally open and alternately in opposite directions disposed double clamps consisting of three legs and two heads arranged between the latter and bridge portions between each pair of adjacent double clamps for connection of the windings of individual coil springs of a frameless spring-insert in mattresses or the like, from a length of wire, comprising the steps of forming said length of wire at points equally spaced apart to a plurality of sinus-shaped bendings with bridge portions between each pair of adjacent sinus-shaped bendings, bending progressively each of said sinus-shaped bendings along an imaginary line to double hook formations having said heads pointing in the same direction and disposed in planes spaced apart from each other, said bending step simultaneously resiliently twisting at least the preceding one of said sinus-shaped bendings in one direction of rotation and at least the adjacent already formed double hook formation in the opposite direction of rotation.

2. The method, as set forth in claim 1, in which said bending step is performed along an imaginary line crossing each of said sinus-shaped bendings close to said heads thereof, which imaginary line forms an obtuse angle with said outer legs of said sinus-shaped bendings.

References Cited in the file of this patent

UNITED STATES PATENTS

| | | |
|---|---|---|
| 456,533 | Bold | July 21, 1891 |
| 1,608,068 | Kunkel | Nov. 23, 1926 |
| 1,882,242 | Dailey | Oct. 11, 1932 |
| 1,890,738 | Lewis | Dec. 13, 1932 |
| 2,130,318 | Cruzan | Sept. 13, 1938 |
| 2,170,483 | Place | Aug. 22, 1939 |
| 2,190,722 | Martin | Feb. 20, 1940 |
| 2,309,851 | Kuhne | Feb. 2, 1943 |
| 2,420,512 | Woller | May 13, 1947 |
| 2,471,777 | Reinartz | May 31, 1949 |
| 2,555,290 | November | May 29, 1951 |
| 2,632,482 | Lincoln | Mar. 24, 1953 |